Figures 1, 2:
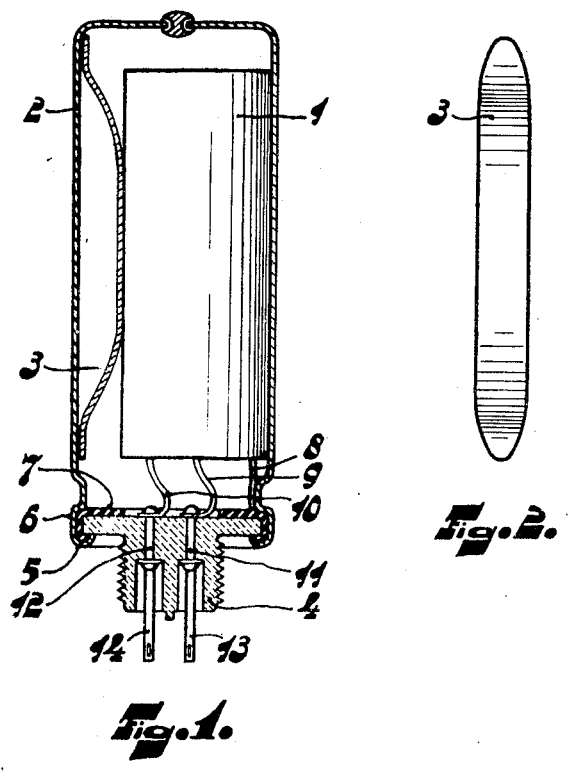

Sept. 2, 1952 R. D. BÜGEL 2,609,426
ELECTROLYTIC CONDENSER
Filed Oct. 28, 1949

INVENTOR.
ROELOF DIRK BUGEL
BY
AGENT

Patented Sept. 2, 1952

2,609,426

UNITED STATES PATENT OFFICE 2,609,426

ELECTROLYTIC CONDENSER

Roelof Dirk Bügel, Eindhoven, Netherlands, assignor to Hartford National Bank and Trust Company, Hartford, Conn., as trustee Application October 28, 1949, Serial No. 124,024
In the Netherlands November 1, 1948

3 Claims. (Cl. 175—315)

The invention relates to electrolytic condensers in which a wound unit is mounted in a surrounding case.

It is known to mount the wound unit centrally in the case, which is usually in the form of an aluminium cylinder, by wrapping the unit in corrugated cardboard before insertion into the case.

According to a further method, the wound unit is inserted into the case and a molten solidifying material poured into the case to hold the wound unit when cool.

It is also known to hold the wound unit centrally by arranging one or more rubber rings to surround the wound unit.

The first-mentioned constructions have a limitation in that the gas-volume of the case is reduced, so that, in the event of generation of heat in the wound unit, an undue pressure may arise inside the case. In addition, the heat transfer from the wound unit to the housing is small, so that the permissible load on the condenser is less.

The last-mentioned construction similarly has the limitation of a low heat transfer from the wound unit to the housing while in the arrangement using a cardboard wrapping, the wound unit is not held rigidly relatively to the case so that movement of the wound unit due to vibration et cetera is transmitted to the connecting wires with consequent risk of their breakage.

The object of the present invention is to provide an electrolytic condenser of improved construction and which is easy to manufacture.

According to the invention, an electrolytic condenser in which a wound unit is mounted in a surrounding case has the wound unit resiliently held against the inner wall of the case by a curved blade spring.

If the casing is cylindrical, it is preferable that the spring should extend primarily in the axial direction of the casing. The volume of the spring is very small compared with that of the housing, so that the gas volume of the complete condenser is but slightly reduced by the presence of the spring. The spring urges the wound unit against the case so that mass forces acting upon the wound unit due to shaking or vibration are not borne by the connecting wires. A further advantage is that a large thermal contact is established between the wound unit and the housing, so that a higher load on the condenser is permissible without entailing excessive increase in temperature of the wound unit. The two ends of the spring preferably engage the inner wall of the housing, while a substantially flat central part of the spring presses against the wound unit. This construction has the advantage that when the wound unit is inserted into the housing after the spring has been placed therein, the probability that the wound unit may be damaged is reduced. Moreover, in view of holding the wound unit, the depth to which the unit is inserted into the housing is unimportant.

The spring may be made of metal, which has the advantage that the spring assists in conducting away the heat produced in the wound unit. The spring is preferably made of hardened aluminium, which metal is resistant to chemical action due to the electrolyte in the wound unit.

In order that the invention may be readily carried into effect, one example will now be described in detail with reference to the accompanying drawings in which:

Fig. 1 is a longitudinal section of a condenser according to the invention showing the wound unit in side elevation, and Fig. 2 is a front elevation view of the spring used in the condenser shown in Fig. 1.

In Fig. 1, the wound unit 1 of an electrolytic twin condenser is arranged in a cylindrical case 2 of aluminium. The case 2 also contains a curved blade spring 3, also of aluminium. In the direction of its length, the spring extends substantially parallel to the axis of the case 2. The free ends of the spring engage the inner wall of the casing, while a substantially flat central part of the spring bears against the wound unit 1, so that the latter is kept in engagement with the inner wall of the case 2.

At the bottom the case 2 is closed by an insulating plug 4 serving as a lead-in member. By means of a flanged edge 5 of the case this member 4 is held against a shoulder 6 of the case. Satisfactory sealing of the case is ensured by rubber bush 7 cemented to the member 4; the outer diameter of this bush is materially larger than that of the member 4. When flanging the edge 5, the rubber is compressed and thus completely seals the apertures between the member 4 and the edge of the case 2. A connecting wire 8 to the common cathode of the two condenser elements, united in the wound unit 1, is also clamped between the bent-over edge of the rubber bush 7 and the edge of the case 2. Two connecting wires 9 and 10 to the anodes of the two condensers are connected inside of the case to rivets 11 and 12, which pass through holes in the lead-in member 4 to connecting tags 13 and 14 respectively, at the outside.

What I claim is:

1. An electrolytic capacitor comprising a tubular metallic casing, a wound foil unit positioned axially within the casing, an elongated curved blade spring having a substantially flat middle portion positioned between a portion of the inner wall of the casing and the foil unit and extending axially within the casing with the ends of the spring resting on the inner wall of the casing, the substantially flat middle portion of said spring urging said foil unit sidewards against the opposite inner wall portion of said casing.

2. An electrolytic capacitor comprising a tubular metallic casing, a wound foil unit positioned axially with the casing, an elongated curved metal blade spring having a substantially flat middle portion positioned between a portion of the inner wall of the casing and the foil unit and extending axially within the casing with the ends of the spring resting on the inner wall of the casing, the substantially flat middle portion of said spring urging said foil unit sidewards against the opposite inner wall portion of said casing.

3. An electrolytic capacitor comprising a tubular metallic casing, a wound foil unit positioned axially within the casing, an elongated curved blade spring of hardened aluminum having a substantially flat middle portion between a portion of the inner wall of the casing and the foil unit and extending axially within the casing with the ends of the spring resting on the inner wall of the casing, the substantially flat middle portion of said spring urging said foil unit sidewards against the opposite inner wall portion of said casing.

ROELOF DIRK BÜGEL.

REFERENCES CITED

The following references are of record in the file of this patent:

UNITED STATES PATENTS

| Number | Name | Date |
| --- | --- | --- |
| 1,267,613 | Whitney | May 28, 1918 |
| 1,633,285 | Proctor | June 21, 1927 |
| 2,125,373 | Georgiev | Aug. 2, 1938 |

FOREIGN PATENTS

| Number | Country | Date |
| --- | --- | --- |
| 134,768 | Switzerland | Oct. 16, 1929 |